United States Patent [19]

Perkins

[11] 4,404,680

[45] Sep. 13, 1983

[54] DIGITAL PHASE SYNCHRONIZER

[75] Inventor: Derrick O. Perkins, Raleigh, N.C.

[73] Assignee: Telex Computer Products, Inc., Raleigh, N.C.

[21] Appl. No.: 203,457

[22] Filed: Nov. 3, 1980

[51] Int. Cl.³ ............................................. H04L 7/02
[52] U.S. Cl. .................................... 375/111; 375/114; 370/100
[58] Field of Search ............... 375/106, 111, 113, 114, 375/116, 118, 119; 370/100, 111; 371/42; 307/262, 269; 331/1 A, 17

[56] References Cited

U.S. PATENT DOCUMENTS

| | | | |
|---|---|---|---|
| 3,493,679 | 2/1970 | Chomicki | 375/87 |
| 3,577,128 | 5/1971 | Criscimagna | 328/63 |
| 3,755,748 | 8/1973 | Carlow et al. | 328/155 |
| 3,889,186 | 6/1975 | Larson | 328/155 |
| 4,125,869 | 11/1978 | Gutmann | 364/900 |
| 4,132,979 | 1/1979 | Heeren | 364/900 |
| 4,158,107 | 6/1979 | Nicholas | 370/100 |
| 4,247,945 | 1/1981 | Seibel | 375/114 |
| 4,298,987 | 3/1981 | Stattel et al. | 375/114 |
| 4,312,074 | 1/1982 | Pautler et al. | 375/114 |

OTHER PUBLICATIONS

R. Galpin, "Ditgital Synchronizer", from IBM Technical Disclosure Bulletin vol. 15 No. Jun. 1972, pp. 81–82.

Primary Examiner—Benedict V. Safourek
Assistant Examiner—Stephen Chin
Attorney, Agent, or Firm—Head, Johnson & Stevenson

[57] ABSTRACT

A state clock provides a bilevel signal of frequency which is an even multiple of the frequency of an incoming digital signal. A plurality of latches are responsive to the state signal. The outputs of the latches go to corresponding inputs of a memory array, the outputs of which are a plurality of terminals equal in number to the binary bits of a word stored in each address of the memory array. One of the output leads of the memory array passes through one of the state latches and to the output circuit. The other outputs go to the state latches where they are stored temporarily. The state latches are set on the rising transition of the state clock, while an input signal latch is set on the falling transition of the state clock. In this way at each cycle of the state clock the phase of the output signal is compared to that of the input signal; and if it is different, a corresponding output word of the memory array is fed back to the input to select the new output word and the new output signal, the phase of which will be closer to the phase of the input signal.

9 Claims, 5 Drawing Figures

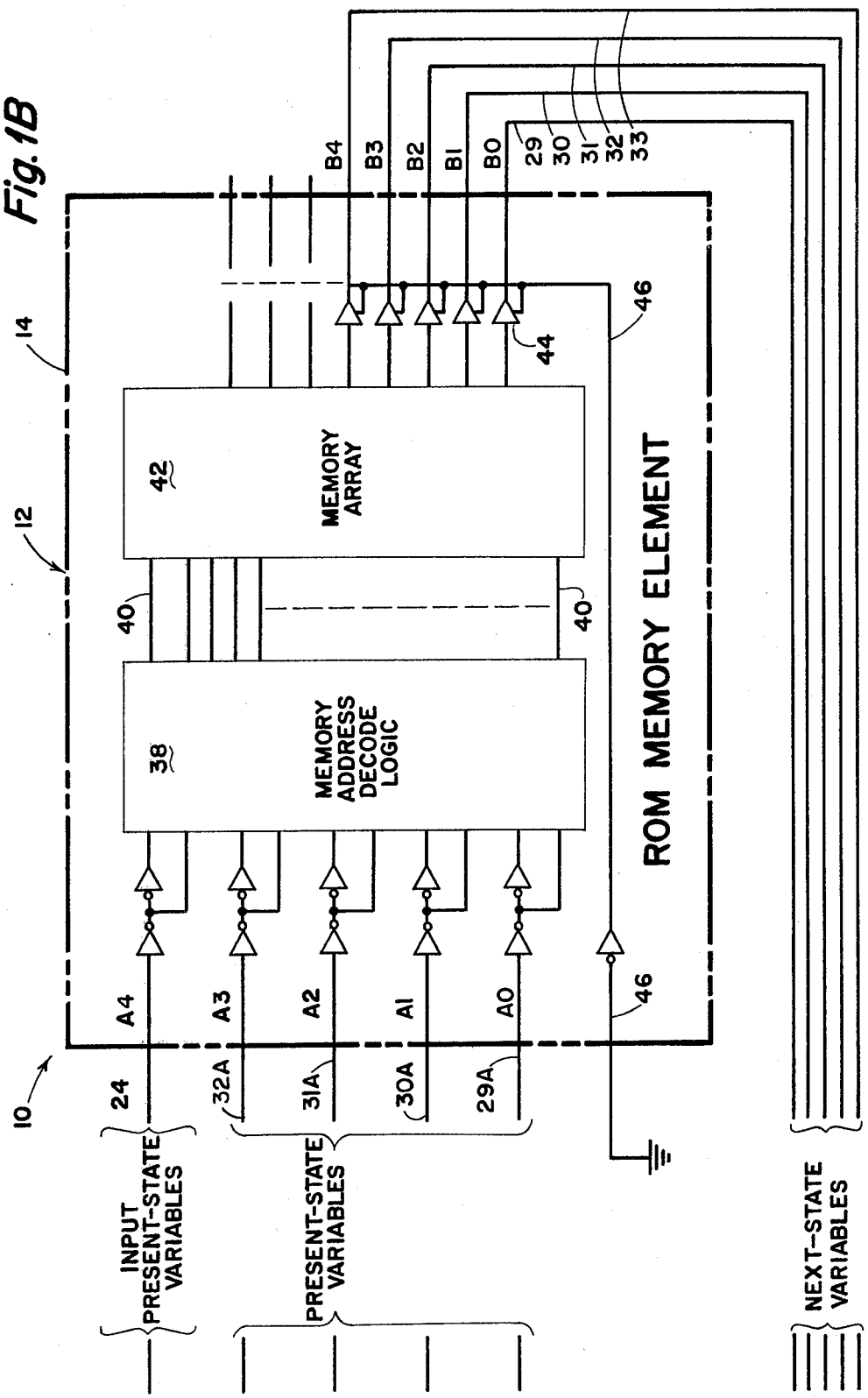

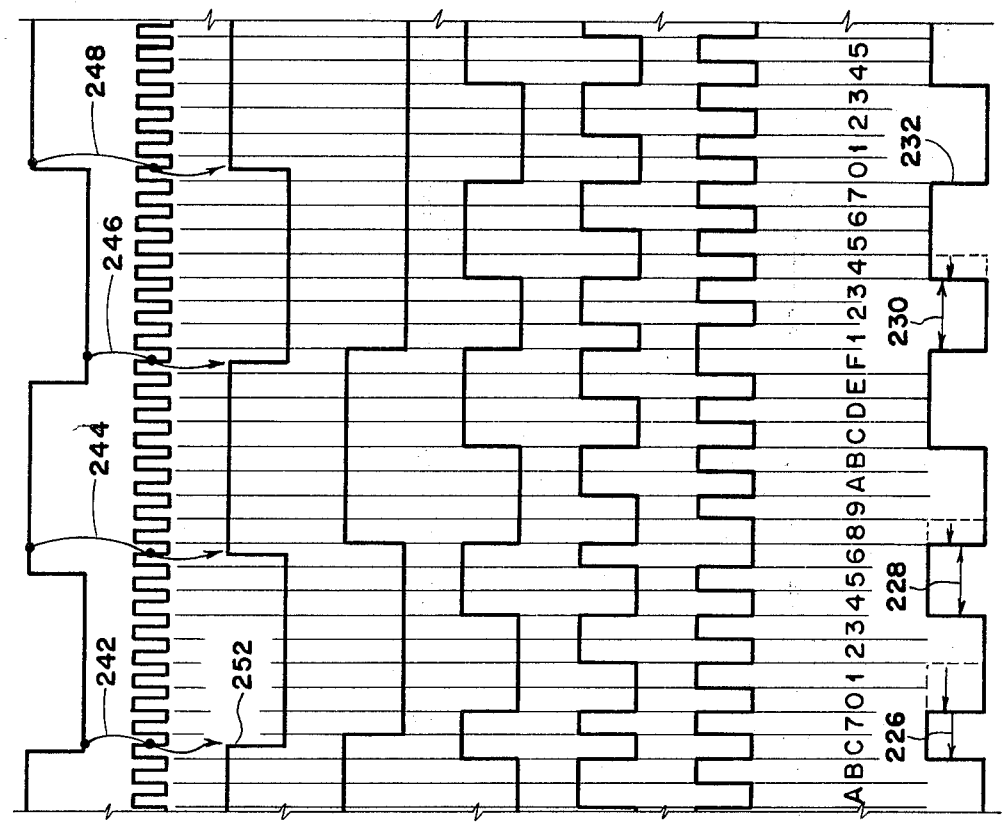

DIGITAL PHASE SYNCHRONIZER

BACKGROUND OF THE INVENTION

Often in the development of devices utilizing electronic circuitry there is a requirement for a means of phase synchronizing a regenerated clock signal to a serial time varying signal and a means of easily controlling the response and performance characteristics of the phase synchronizing means.

Such phase synchronizing means are required in a number of digital circuits such as, for example, a received clock recovery system for the reception of serial bi-level data and digital phase-locked loop (DPLL) for use in frequency multipliers, signal synchronizers, and clock regenerators.

In the past, various means for providing phase synchronization have been used, such as for example, phase-locked loops utilizing an electronic phase detector, analog filter, voltage controlled oscillator and programmable divide by N counters. The main disadvantage of this type of circuit is that in order to change the circuit performance charactertic, certain components must be replaced by different values or other components. Circuit complexity is another big disadvantage, along with component parameter deviations.

Also involved are pre-settable counters which are operated at a specified frequency and whose count is pre-set by input signal transitions. The major disadvantages of this type are circuit complexity and the difficulty in changing the performance characteristics which usually require circuit hardware changes.

SUMMARY OF THE INVENTION

It is a primary object of this invention to provide means for synchronizing a clock recovery signal to an incoming varying digital signal.

It is a further object of this invention to provide a synchronizing clock recovery signal which is entirely electronic and entirely digital so as to avoid the disadvantages of analog type circuitry.

It is a still further object of this invention to provide a clock synchronizing system which utilizes a memory device having a selected number of memory locations, one corresponding to each of the state clock periods within one period of the incoming signal. Depending on the time of occurrence of a phase transition in the incoming signal a suitable address location is determined and the word stored therein determines the phase of the clock which is utilized on the next cycle.

It is a still further object of this invention to provide such memory means for storing phase information for the state clock in the form of a pre-wired ROM, or by using a programmable logic array, or a random access memory, to obtain any selected relationship between the output digital words of the memory and the corresponding input address words to the memory.

These and other objects are realized and the limitations of the prior art are overcome in this invention by utilizing a relatively simple feedback circuit into which the received signal is latched on the falling transition of the state clock, the state clock being a locally generated clock having a frequency which is N times the data rate of the input signal wherein N is an even integer. By making the integer larger a greater precision is obtained in the synchronization of the state clock to the incoming signal.

A memory device is utilized as a means for logically determining when a shift in phase of the clock is required and to approach and to synchronize with the incoming signal. This memory device can be a prewired ROM wherein the program stored is designed to provide a selected dynamic operation in the synchronizing process. For example, one method of synchronizing would be on occurrence of a phase transition of the input data to immediately select a particular cycle of the state clock which would synchronize the next transition of the clock within a narrow phase error to the transition of the input data. Such a complete and rapid synchronization is undesirable since if there is a phase jitter or oscillation of the input signal, then the synchronizing process responds to every phase change of the input signal and is never completely synchronized.

In the optimum mode of operation of this invention the state clock is not synchronized completely in one cycle of the state clock, but is moved in increments in phase leading or lagging, to approach synchronization within one, two, or three cycles of the state clock.

In place of a pre-wired, pre-designed program in the ROM, a random access memory can be used so that by utilization of a small computer, or micro-computer, or microprocessor the program can be altered in the memory element to change the mode of operation of the synchronizing process. In this way it is possible to operate this type of phase synchronizer in many modes, without any change of hardware whatsoever.

In the process of this invention a sufficient number of next-state variables are provided ($2^x$, including input variables) and are utilized in one period of the input signal. Depending on which of these $2^x$ cycles detects the next phase transition of the incoming signal, the proper address of the memory element is entered and a corresponding output word of M bits is utilized to determine the next cycle of the state clock. This particular cycle of the state clock will bring the output signal(s), which is one or more of the M outputs of the memory element, closer to synchronism with the incoming signal. On the next transition of the incoming signal, again, an address is selected and the stored word then determines the next state cycle of the state clock to bring the output signal(s) into synchronization with the incoming signal.

In this mode of operation the output signal is generally of the frequency of the input signal or data rate, so that each cycle of the output corresponds to one period of the input signal. The ROM memory stores all possible internal and output state variables which define the response of the system to the input signals. The output of the memory represents the "next-state" system variables and are fed back to the address inputs of the ROM memory via the multiple "present-state" latch which defines the present internal and output states during any given state-time. This code and the input signal, form the address inputs to the ROM, which directs the memory to the proper "next-state" location. Thus, the closed loop transfer function of the output with respect to the input is determined by the digital code stored in the ROM. By changing this code, it is possible to change the dynamic circuit response to the input signal. The use of a random access memory (RAM) instead of the ROM would allow the digital code to be changed by a central processing unit, for example, and thus the performance characteristics, such as stability and acquisition time, can be optimized in response to phase changes of any given input signal. Also by decreasing the state clock period, further resolution of the circuit response parameters can be obtained.

These elements form a clocked sequential state machine whose state time is defined by the period of the system clock.

BRIEF DESCRIPTION OF THE DRAWINGS

These and other objects and advantages of this invention and a better understanding of the principles and details of the invention will be evident from the following description taken in conjunction with the appended drawings in which:

FIGS. 1A and 1B together form a schematic diagram of the apparatus of this invention based on a frequency of the state clock of N times the frequency of the input signal of data rate (N times the nominal receive clock frequency).

FIGS. 3A and 3B together illustrate the wave shape of the state clock and of each of the signals on the output of the memory element and the manner in which the particular cycles of the state clock, in order to proceed towards or into synchronism between the output signal of this device and the incoming signal.

DETAILED DESCRIPTION OF THE PREFERRED EMBODIMENTS

Figure 1A:
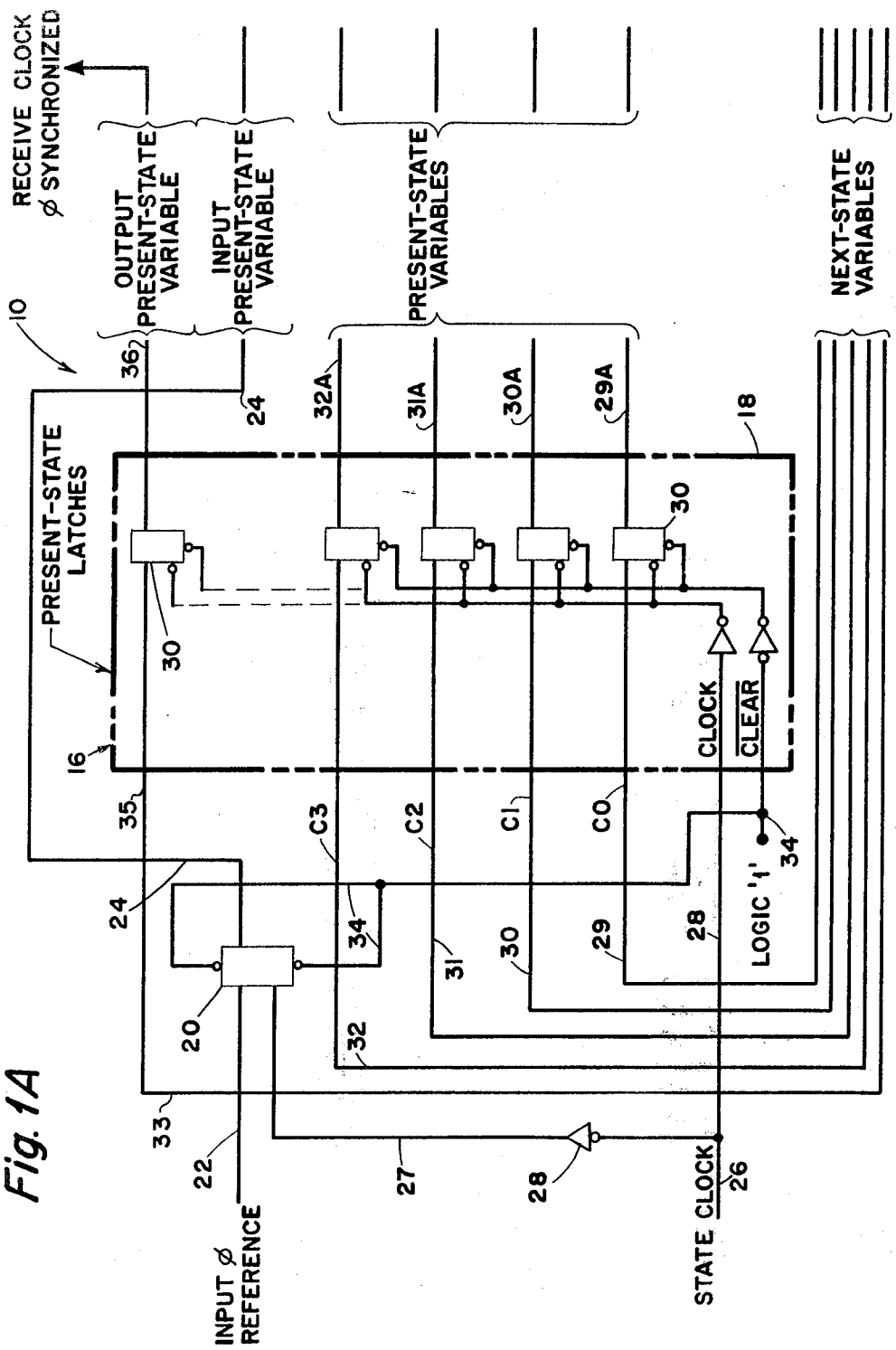

Referring now to the drawings and in particular to FIG. 1, there is shown one embodiment of this invention which uses a ROM memory element which is indicated generally by the numeral 12. The entire apparatus is indicated generally by the numeral 10. There are a group of latches, called present-state latches, indicated generally by the numeral 16 within the black-bordered rectangle 18. There is also a latch 20 which is connected serially into the input lead 22 so as to latch the input signal. All of these latches are of conventional design and generally comprise flip-flops, which can be set and re-set by the rising or falling transitions of the state clock.

The conductor 26 marked state clock comes from a conventional oscillator which is of selected frequency which is an even integer multiple N of the frequency 1/T (period) of the input signal. The state clock puts out a digital signal which is conventional in every way and needs no further description.

The principal part of the device is the memory element 12 which is bounded within the rectangle 14. This includes a group of input leads A0, A1, A2, A3, and A4 which are connected to a memory address decode logic 38 which converts signals on these five input leads, in the form of high or low values of digital signal, to one of a unique group of memory addresses in the memory array 42 such that a unique address is defined and is entered and the digital word stored therein is transmitted to the outputs on the five output lines B0, B1, B2, B3, and B4.

The input signals of the memory element comprise five digital signals either high or low at the time of latching. The state clock is an even multiple N times the frequency of the input signal. The number of addresses in the memory elements is $2^x$, where $X=[(M-Y)+Z]$. Where $Z$=total number of input signals and $Y$ is the number of output signals; $(M-Y)$ is determined by the complexity of the synchronization and the total number of binary bits needed to define the number of discrete next-state variables required to describe the synchronization function. In the illustrated example $(M-Y)=(M-1)=\log_2(2N)=\log_2(2\times 8)=4$. Dependent upon the digital signals on the five $2^x$ input leads A0, A1, A2, A3, and A4 a selected one of the $2^x$ input addresses is generated by the decode logic 38 and is transmitted by leads 40 to the memory array 42. Stored in the memory addresses are five bit digital words which are read out through means 44 upon signal on line 46, to the output lines B0, B1, B2, B3, and B4.

Each of the $2^x$ addresses corresponds to one cycle of the state clock. There are N cycles of the clock corresponding to one period of the NRZ input data signal. Four of the output leads 29, 30, 31, and 32 from the five output terminals are brought to the input terminals C0, C1, C2, and C3 of the state latch 16 and the fourth output B4 is carried by leads 33 to terminal 35 of the state latch 16. The output of the latch 16 corresponding to input terminal 35 goes by lead 36 as the output of this apparatus of the synchronized receive clock. The other four outputs of the memory array become the state variables for the next state cycle of the state clock. After latching through the latch assembly 16, the four inputs are delivered by leads 29A, 30A, 31A, and 32A as four inputs to the memory address decode logic. The input signal 22 after latching at 20, forms the 5th present-state variable. Thus, depending upon the particular output word stored in the memory array which depends upon the actual present-state signals on the input to the memory array, a selected one of the 2N states of the state clock are selected as the next state of the output signal. This will be further clarified in describing FIGS. 2 and 3.

However, before proceeding to these other figures, it should be pointed out that the state clock 26 has two branches, one going through an inverter 28 and line 27 to the clock input of the latch 20, while the other branch 28 goes to the clock input of the latches in latch assembly 16. Thus the latch 20 and the latches 16 are set on succeeding half cycles of the state clock. The state variables on leads C0, C1, C2, and C3, when latched, are impressed on terminals A0, A1, A2, A3, and A4 of the ROM memory element. They are latched in on the rising transition of the state clock, while the incoming signal on 22 is latched in at 20 on the falling transition of the state clock, as will be shown in FIG. 2.

While the value of N can be an even integer which, for example, can be in the range of 8 to 32 or more, in the example to be described, the value of N=8 will be used by way of example and not by way of limitation.

Figure 2:
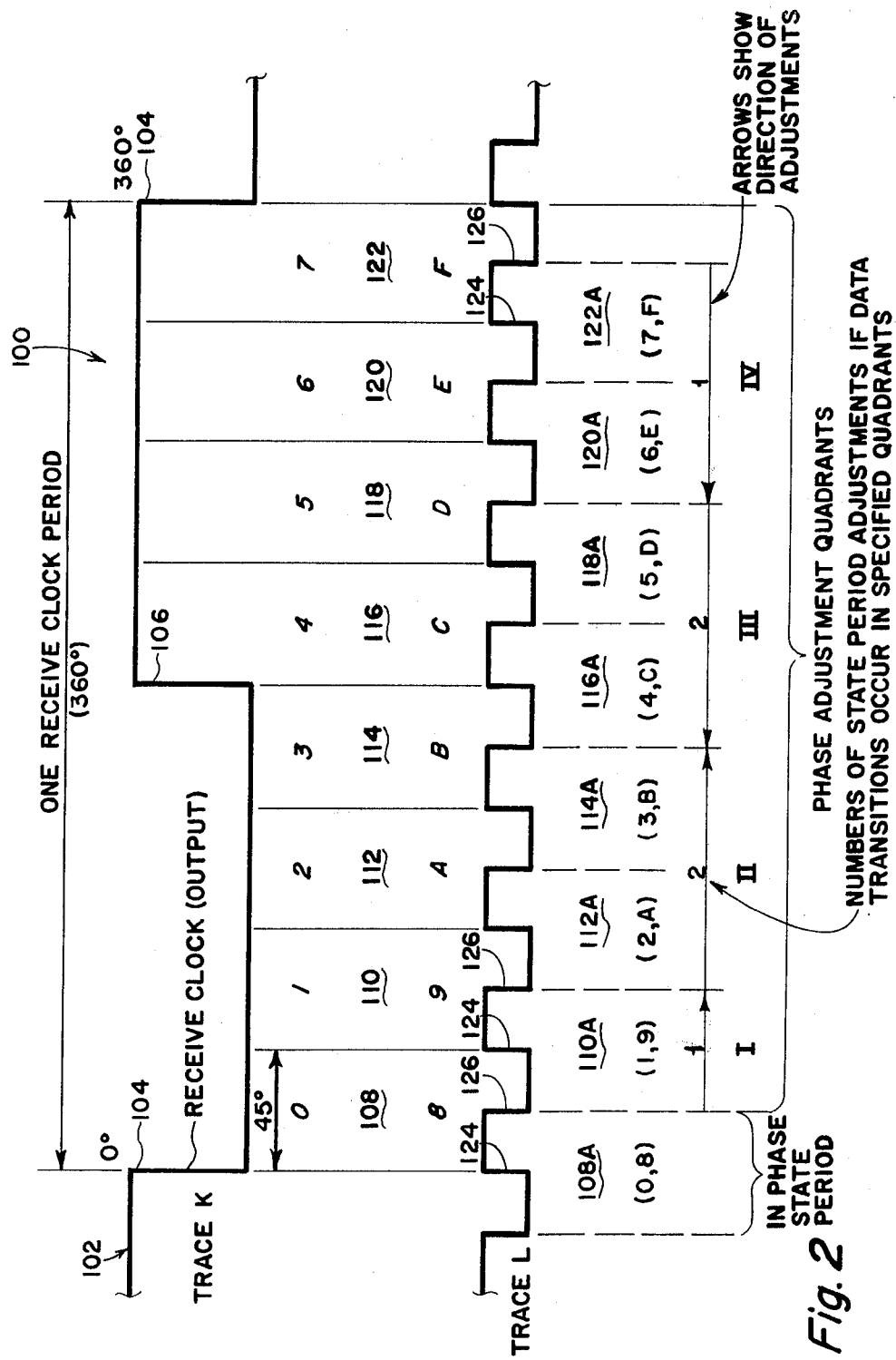
FIG. 2 illustrates the manner in which the quantities are latched in the circuit of FIGS. 1A and 1B and the relationship between each of the N cycles of the state clock corresponding to a period of the incoming signal.
Figure 3A:
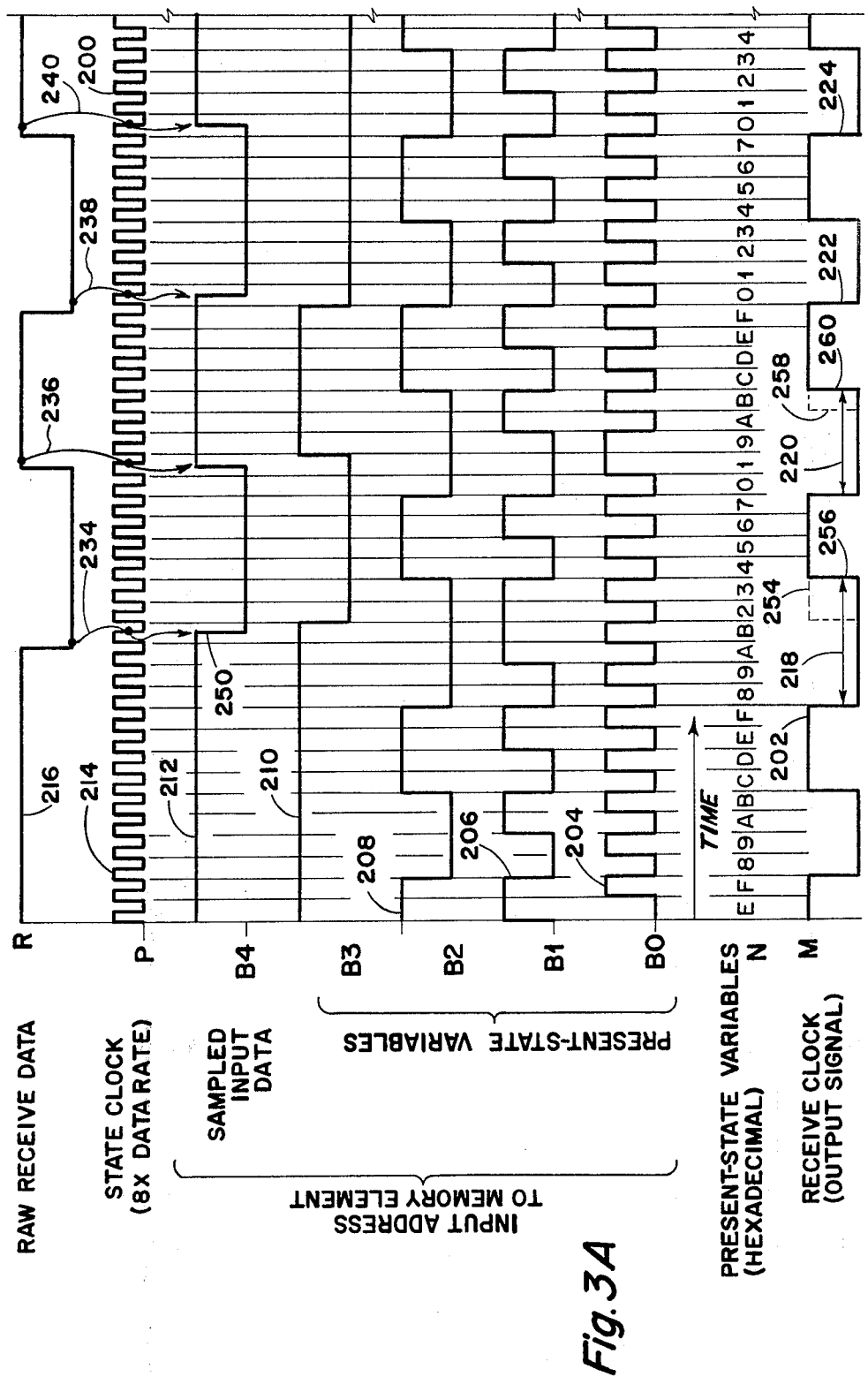

In FIG. 2 is shown in trace K one cycle of the receive clock (output) shown on lead 36 of FIG. 1. This is a bi-level signal 102, varying from a high logic level (1) to a low logic level (∅) on alternate half cycles with vertical transitions 104 (falling) and 106 (rising). This signal is at ⅛th the frequency of the state clock.

The time periods 108, 110, 112, . . . 122 represent periods or cycles of the state clock shown on trace L. As described in connection with FIG. 1, on the rising transition of the state clock 124 the state variables are latched, and on the falling transition 126 the incoming signal is sampled. If the transition of the received input signal falls in the first period 108A of the state clock, it is considered to be in phase with the input signal, within 22.5° of phase, plus or minus, which is the closest that can be provided with a clock where N=8.

As shown in the cycle zones 108, 110, 112, . . . 122, there are 8 zones ∅, 1, 2, 3, 4, 5, 6, 7 for the logic ∅ value during one data period of the input, and another 8 zones 8, 9, A, B, C, D, E, and F for the corresponding logic 1 value during one data period of the input. Thus there are 8 possible time (phase) zones in which, say, the falling transition can occur, each zone being defined by one of two variables, depending on whether the input signal is a logic ∅ or logic 7. With 16 state variables involved, it is convenient to describe the system in terms of a hexadecimal number. This is a numbering system in which each integer has sixteen parts.

If a data transition occurs during any sampling period other than (∅, 8), the next-state variable is such that the output signal phase is shifted either forward or backward in time, relative to the input data transition. The amount of the phase shift is dependent upon the magnitude of the phase difference, i.e., in which of the eight (8) sampling periods the transition occurs. Phase adjustments are made in increments of either 45° or 90° (see FIG. 3A).

If the data transition occurs during the sampling period for state ∅ (Hex) or state 8 (Hex), then the receive clock is considered to be in phase with the receive data. When no data transitions are occurring, or when the output signal is in phase with the data, the circuit will sequence through its present-state variables, and generates no phase adjustment. One state adjustment provides a 45° phase adjustment.

In FIG. 2 the hexadecimal notations ∅, 1, 2, 3, 4, 5, 6, 7 in zones of the state clock 108, 110, 112, . . . 122, respectively indicate the sequential states defining the receive clock when input received data has no logic level transitions and remains at a constant level (logic ∅). Correspondingly, the hexadecimal notations 8, 9, A, B, C, D, E, F, indicate the sequential states defining the receive clock when input receive data has no level transitions and remains at a constant high level (logic 1).

The received clock is assumed in phase if a data level transition occurs during sample period 108A. The transition 106 in trace 102 should be located at the center of the data bit cell period for zero phase error. With an 8X state clock, the signal is considered to be in-phase, even though there may be an error of ±22.5°.

TABLE 1

| ROM ADDRESS (PRESENT-STATE VARIABLE) | | | | | | ROM OUTPUT DATA (NEXT-STATE VARIABLE) | | | | | |
|---|---|---|---|---|---|---|---|---|---|---|---|
| | BINARY | | | | | | BINARY | | | | |
| HEX | A4 | A3 | A2 | A1 | A∅ | HEX | B4 | B3 | B2 | B1 | B∅ |
| ∅∅ | ∅ | ∅ | ∅ | ∅ | ∅ | ∅1 | ∅ | ∅ | ∅ | ∅ | 1 |
| ∅1 | ∅ | ∅ | ∅ | ∅ | 1 | ∅2 | ∅ | ∅ | ∅ | 1 | ∅ |
| ∅2 | ∅ | ∅ | ∅ | 1 | ∅ | ∅3 | ∅ | ∅ | ∅ | 1 | 1 |
| ∅3 | ∅ | ∅ | ∅ | 1 | 1 | ∅4 | ∅ | ∅ | 1 | ∅ | ∅ |
| ∅4 | ∅ | ∅ | 1 | ∅ | ∅ | 15 | 1 | ∅ | 1 | ∅ | 1 |
| ∅5 | ∅ | ∅ | 1 | ∅ | 1 | 16 | 1 | ∅ | 1 | 1 | ∅ |
| ∅6 | ∅ | ∅ | 1 | 1 | ∅ | 17 | 1 | ∅ | 1 | 1 | 1 |
| ∅7 | ∅ | ∅ | 1 | 1 | 1 | 1∅ | 1 | ∅ | ∅ | ∅ | ∅ |
| ∅8 | ∅ | 1 | ∅ | ∅ | ∅ | ∅1 | ∅ | ∅ | ∅ | ∅ | 1 |
| ∅9 | ∅ | 1 | ∅ | ∅ | 1 | ∅1 | ∅ | ∅ | ∅ | ∅ | 1 |
| ∅A | ∅ | 1 | ∅ | 1 | ∅ | ∅1 | ∅ | ∅ | ∅ | ∅ | 1 |
| ∅B | ∅ | 1 | ∅ | 1 | 1 | ∅2 | ∅ | ∅ | ∅ | 1 | ∅ |
| ∅C | ∅ | 1 | 1 | ∅ | ∅ | 17 | 1 | ∅ | 1 | 1 | 1 |
| ∅D | ∅ | 1 | 1 | ∅ | 1 | 1∅ | 1 | ∅ | ∅ | ∅ | ∅ |
| ∅E | ∅ | 1 | 1 | 1 | ∅ | 1∅ | 1 | ∅ | ∅ | ∅ | ∅ |
| ∅F | ∅ | 1 | 1 | 1 | 1 | 11 | 1 | ∅ | ∅ | ∅ | 1 |
| 1∅ | 1 | ∅ | ∅ | ∅ | ∅ | ∅9 | ∅ | 1 | ∅ | ∅ | 1 |
| 11 | 1 | ∅ | ∅ | ∅ | 1 | ∅9 | ∅ | 1 | ∅ | ∅ | 1 |
| 12 | 1 | ∅ | ∅ | 1 | ∅ | ∅9 | ∅ | 1 | ∅ | ∅ | 1 |
| 13 | 1 | ∅ | ∅ | 1 | 1 | ∅A | ∅ | 1 | ∅ | 1 | ∅ |
| 14 | 1 | ∅ | 1 | ∅ | ∅ | 1F | 1 | 1 | 1 | 1 | 1 |
| 15 | 1 | ∅ | 1 | ∅ | 1 | 18 | 1 | 1 | ∅ | ∅ | ∅ |
| 16 | 1 | ∅ | 1 | 1 | ∅ | 18 | 1 | 1 | ∅ | ∅ | ∅ |
| 17 | 1 | ∅ | 1 | 1 | 1 | 19 | 1 | 1 | ∅ | ∅ | 1 |
| 18 | 1 | 1 | ∅ | ∅ | ∅ | ∅9 | ∅ | 1 | ∅ | ∅ | 1 |
| 19 | 1 | 1 | ∅ | ∅ | 1 | ∅A | ∅ | 1 | ∅ | 1 | ∅ |
| 1A | 1 | 1 | ∅ | 1 | ∅ | ∅B | ∅ | 1 | ∅ | 1 | 1 |
| 1B | 1 | 1 | ∅ | 1 | 1 | ∅C | ∅ | 1 | 1 | ∅ | ∅ |
| 1C | 1 | 1 | 1 | ∅ | ∅ | 1D | 1 | 1 | 1 | ∅ | 1 |
| 1D | 1 | 1 | 1 | ∅ | 1 | 1E | 1 | 1 | 1 | 1 | ∅ |
| 1E | 1 | 1 | 1 | 1 | ∅ | 1F | 1 | 1 | 1 | 1 | 1 |
| 1F | 1 | 1 | 1 | 1 | 1 | 1∅ | 1 | ∅ | ∅ | ∅ | ∅ |

In Table 1, there is a compilation of 32 numbers, ∅∅ to ∅ F, and 1∅ to 1F. These represent addresses for the ROM memory. Corresponding to the hexadecimal numbering, there are presented in the next 5 columns, binary representations of these numbers. These binary numbers correspond to the logic levels on the five inputs A∅, A1, A2, A3, and A4 of the ROM. These logic levels are called the present-state variables.

In Table 1 there are similar 6 columns in hexadecimal and binary representation, which are the data stored in the address elements to the ROM. The binary number outputs of the ROM are called the next-state variables, which are fed back through the state latch 16 to the input to the ROM on the next cycle of the state clock. To be more exact, only 4 variables in the output of the ROM are fed back to the input. The fifth, on line 33 after latching, goes to the output 36, forming the synchronized receive clock. The latched input signal forms the 5th input variables on A4 of the ROM.

Table 1 can be said to represent the dynamic response of the synchronizer. Many different responses with different response tables, like Table 1, can be used. Each of these tables could be said to represent a "program" of the memory, each one different for a different value of N and for a different response characteristic of the dynamic response, and for different types of input signal(s). These programs form no part of this invention, which is embodied in the apparatus of FIG. 1, and the memory element can be preprogrammed logic network (hard wired), a programmable logic array, or a random access memory, and so on.

In the program of Table 1, the manner of synchronization involves a choice of the dynamic response. In the case of the example of description, if the clock is out of synchronism with the input by one cycle of the clock, as in zone 110A, then the state variables are shifted by 1 zone forward or backward. If the clock is out of synchronism by 2 clock periods, the state variables are shifted (in accordance with Table 1) by 2 zones 112A, 114A, to the right. If the clock is still not in synchronism, then additional shifts of the state variables are made, in accordance with the phase adjustment quadrants I, II, III, and IV, at the bottom of FIG. 2, and so on.

FIG. 3 is a timing diagram of the circuit of FIG. 1, illustrating the process of phase adjustment, described in FIG. 2. In particular, two cases of phase adjustment are illustrated.

The timing of FIG. 3 is illustrated by means of a number of traces, M through R.

Starting with trace P, there is shown the state clock signal, on trace 26 of FIG. 1. This is identified by numeral 214. Trace R is the uncorrected varying incoming signal 216. At points 234, 236, 238, 240, 242, 244, 248, and 250 are shown the sampling operations of the raw input signal R taking place in the down transition of the state clock. This provides the trace B4, 212 which is the sampled input.

The input signal is shown for convenience as an NRZ recorded signal. In the trace 216 preceding sampling point 234, there are no transitions, indicating a series of logic 1 values. The sampling at points 234-248 is accomplished by the latch 20.

Trace 212, the sampled input signal is entered into the ROM memory element as A4.

Traces B0, B1, B2, B3 are traces drawn through points of logic 0 or 1, read from the output of the ROM. These values at B0, B1, B2, B3, and B4 are called next-state values, and will form (except B4) the present-state variables when latched by means 16 into the input A0, A1, A2, A3 of the ROM element. The 5th output B4 becomes, after latching, the output present-state variable on lead 36 and shown at trace M.

It will be clear that the instantaneous values of the state clock 214, and present-state variables B0, B1, B2, B3 correspond to the binary words of Table 1.

Line N represents the present-state variables in hexadecimal notation as in Table 1 and the time zones in FIG. 2.

Last, but not least, is the trace M, which represents the synchronized clock (output signal) and illustrates how the synchronization is accomplished.

At times 250 and 252 shown on trace B4, the errors in phase are such that some correction is necessary. Consider time 250, where a data transition occurs which is approximately +135° out of phase with the output signal. The data change is latched (signal B4) on the falling edge of the state clock during present state ∅ B (Hex) trace N. The next-state variable for the memory address (present-state variable) ∅B (Hex) is normally ∅C (Hex); however, since an input data transition from a logic one to a logic zero has occurred during present-state ∅B (Hex), then the next-state variable becomes ∅2 (Hex). Therefore, on the next rising edge of the state clock, the present-state variable becomes ∅2 (Hex). This effectively shifts the output signal by two state periods later in time, as would be indicated in trace M.

The next transition of the data occurs at 258 during the sampling period for present-state 1 (Hex) and the output is shifted ahead one (1) state period. Upon the occurrence of the third transition, the output is now in phase with the input data (state ∅ Hex), and no more phase adjustments are made.

At time 252 another data transition occurs which is approximately −180° out of phase with the output signal. The data change is latched (signal B4) on the falling edge of the state clock during present-state C (Hex). The next-state variable then becomes 7 (Hex) instead of D (Hex) (See Table 1). On the next rising edge of the state clock the present-state variable becomes 7 (Hex). This effectively shifts the output signals two state periods *ahead* in time, as would be indicated by FIG. 3.

The next two (2) data transitions occur during the sampling periods for present-states 6 (Hex) and F (Hex), respectively, and each shift the output signal one (1) state period *ahead* in time. The fourth data transition occurs during the sampling period for present state 0 (Hex), and, therefore, causes no phase adjustment. The output is now in phase with the input data. These corrections place the output signal, trace M, 202 in synchronism at times 222, 224, 232, etc.

The acquisition characteristics of this circuit guarantee that for the worst case phase difference (+/−180°) a maximum of three (3) data transitions are required for phase synchronization. Also, the worst case static phase error (while synchronized) is +/−½ the state clock period, around the 0° phase reference of the output.

In FIG. 3, as indicated, time increases to the right. Numeral 218 indicates the delay or retardation of the output clock signal by 2 periods of the state clock. Numeral 220 indicates a delay of 1 period. Numeral 226 indicates the shortening or movement ahead of the transition of the output clock of two state periods. Numerals 228 and 230 indicate shortening by 1 state period.

While I have described and illustrated the invention in terms of a single input signal, the basic circuit can accommodate plural signals. The basic relationship is $X = [(M − Y) + Z)]$, where Z is the total number of input signals; (M − Y) is determined by the desired complexity of the synchronization function and the total number of binary bits needed to define the number of discrete next-state variables required to describe the synchronization function. In the illustrated example, $(M − Y) = (M − 1) = \log_2 (2N) = \log_2 (2 \times 8) = 4$.

The present-state latches are commercial, such as Signetics 74LS273, as in the ROM memory element which can be Signetics 82S123. All of the other circuit elements are conventional, commercial, and well known and need no further description. Elements 44 are tristate output buffer elements.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. Apparatus for synchronizing a clock recovery signal to an incoming phase-varying digital signal (input signal), comprising;
   (a) state clock means to provide a bilevel signal of frequency N times the nominal frequency of said incoming signal where N is a selected even number;
   (b) memory means having a selected number of independently addressable addresses in which are stored corresponding selected different binary numbers each having a selected number M of binary bits; and M output leads equal in number to the number of bits in each stored word;
   (c) state latch means comprising M latch means responsive to said state clock for temporary storage of binary bits, said state latch means having at least M separate inputs to one of which each of the M output leads from said memory are connected; and means to set each of said M latch means on the rising transition of each cycle of said state clock;
   (d) received data latch and means to set said received data latch on the falling transition of each cycle of said state clock for sampling said input signal;

(e) a selected number, say (M−Y) of the outputs of said M latches in said state latch means connected to M−Y input leads of said memory, the Yth output of said M latches carrying the output signal of said apparatus, where Y is the number of input and output signals;

(f) the output of said received data latch connected to the Yth input lead to said memory means, each of the M input signals comprising M bits of a binary word defining the address of a selected storage location in said memory;

whereby, dependent upon the particular polarities of the M input leads to said memory means, selected ones of the memory locations are determined and the M bit words stored therein are impressed on the M output leads, M−Y of which and the input signal are connected to the inputs of said state latch means, which are latched into said memory means on the next cycle of said state clock.

2. The apparatus as in claim 1 in which said selected number of addresses is $2^x$, where $X=[(M-Y)+Z]$; where Z is the total number of input signals and Y is the number of output signals.

3. The apparatus as in claim 2 in which $(M-Y)=(M-1)=\log_2(2N)=\log_2(2\times 8)=4$.

4. The apparatus as in claim 1 in which said memory means is a read only memory means.

5. The apparatus as in claim 1 in which said memory means is a random-access memory means.

6. The apparatus as in claim 1 in which said memory means is a programmable logic array.

7. The apparatus as in claim 1 in which said latches comprise flip-flops.

8. The apparatus as in claim 1 in which the output is of a frequency equal to that of the data rate of the input signal.

9. The apparatus as in claim 1 in which the output if of a frequency not equal to that of the data rate of the output signal.

* * * * *